United States Patent [19]
Lim et al.

[11] Patent Number: 5,316,042
[45] Date of Patent: May 31, 1994

[54] MULTI-WAY ROTARY VALVE

[75] Inventors: Moo-Seang Lim; Jong-Man Yun, both of Seoul; Chan-Kyu Park, Incheon; Sang-Dae Lee, Incheon; Sun-Chae Ma, Incheon; Seung-Seob Oh, Incheon; Eui-Sik Jeong, Incheon; Kwang-Sun Paek, Incheon, all of Rep. of Korea

[73] Assignee: Daewoo Electronics Co., Ltd., Seoul, Rep. of Korea

[21] Appl. No.: 24,159

[22] Filed: Mar. 1, 1993

[30] Foreign Application Priority Data

Sep. 4, 1992 [KR] Rep. of Korea ............... 92-16112

[51] Int. Cl.[5] .............................................. F16K 3/00
[52] U.S. Cl. ..................... 137/625.11; 137/625.15
[58] Field of Search ................... 137/625.11, 625.15, 137/625.46

[56] References Cited
U.S. PATENT DOCUMENTS

| 3,079,948 | 3/1963 | Allen | 137/625.11 X |
| 3,780,758 | 12/1973 | DeVries | 137/625.46 X |
| 4,178,963 | 12/1979 | Riefler | 137/625.11 X |
| 4,458,708 | 7/1984 | Leonard | 137/625.11 X |
| 4,673,160 | 6/1987 | Tolley | 137/625.46 X |

Primary Examiner—Robert G. Nilson
Attorney, Agent, or Firm—William F. Pinsak

[57] ABSTRACT

A novel multi-way valve is provided comprising an upper casing and a lower casing combined with the upper casing to form a fluid chamber therebetween, the lower casing having at least three outlet ports arranged in a predetermined angular spacing. A lower valve body is fixedly mounted on the bottom of the lower casing. The lower valve body has at least three passage holes coinciding with the corresponding outlet ports of the lower casing. An upper valve body comes into a fluid-tight, frictional contact with the lower valve body for rotational movement with respect thereto, the upper valve body having an arcuate slot which is selectively aligned with one or more of the passage holes of the lower valve body.

3 Claims, 4 Drawing Sheets

MULTI-WAY ROTARY VALVE

FIELD OF THE INVENTION

The present invention relates to a multi-way rotary valve and is more specifically concerned with a multi-way rotary disc valve of the type wherein a pair of disc-like valve bodies is in a fluid-tight, sliding engagement with each other to selectively direct the fluid under pressure to any one of several flow paths, depending on the operation mode of the machine or system incorporating the same.

DESCRIPTION OF THE PRIOR ART

As is well-known, multi-way valves have been used for the purpose of directional control of pressurized fluid in, e.g., a machine designed to perform certain operations through the use of hydraulic pressure. Because of inherent drawbacks of the prior art multi-way valves, a great deal of efforts has heretofore been made to provide an improved multi-way valve which is simple in structure, dependable in operation and less costly to manufacture.

U.S. Pat. No. 3,872,889 issued to Smith et al. on Mar. 25, 1975 discloses a multi-way disc valve comprising a spring loaded, plunger-type shear seal which is able to operatively communicate a pressure port with a system port in one position and to vent the system port in another position. The plunger-type shear seal includes a tubular sleeve carried by a rotatable member, the sleeve having an annular seal surface for selectively establishing fluid communication among a plurality of ports defined In the valving surface of a valve body. Not only does the multi-way valve require a sophisticated, highly durable seal arrangement at its valving surface but also it lacks the ability to distribute the pressurized fluid to one or more of multiple outlet ports in an automated way.

U.S. Pat. No. 4,595,034 issued to Hutson on Jun. 17, 1986 teaches a four way rotary valve for hydraulic devices whose valve member may be rotated between its various positions by manually turning the valve actuator through a relatively small angle so as to facilitate simple and easy actuation of the valve. The valve actuator is biased toward its neutral position and is positively stopped in its active positions. While the four way valve disclosed in the Hutson patent appears to alleviate the inconvenience encountered in the manual operation thereof, it suffers from an increased structural complexity which in turn makes the valve expensive.

SUMMARY OF THE INVENTION

Accordingly, it is an object of the invention to provide a multi-way rotary valve which is simple in structure, easy to fabricate and capable of selectively distributing fluid under pressure to one or more of at least three outlet ports without requiring any manual operation thereof.

In accordance with the present invention, provided is a multi-way rotary valve which comprises: an upper casing having an inlet port; a lower casing combined with the upper casing to form a fluid chamber therebetween, the lower casing having three or more outlet ports; a lower valve body fixedly mounted on the bottom of the lower casing, the lower valve body having three or more passage holes which coincide with the corresponding outlet ports of the lower casing; an upper valve body coming into a fluid-tight, sliding contact with the lower valve body for rotational movement with respect thereto, the upper valve body having an arcuate slot which, in response to the rotational movement of the upper valve body, is selectively registered with one or more of the passage holes of the lower valve body to establish a flow path; and means responsive to the operation mode of the valve for causing the upper valve body to rotate to a predetermined angular position.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
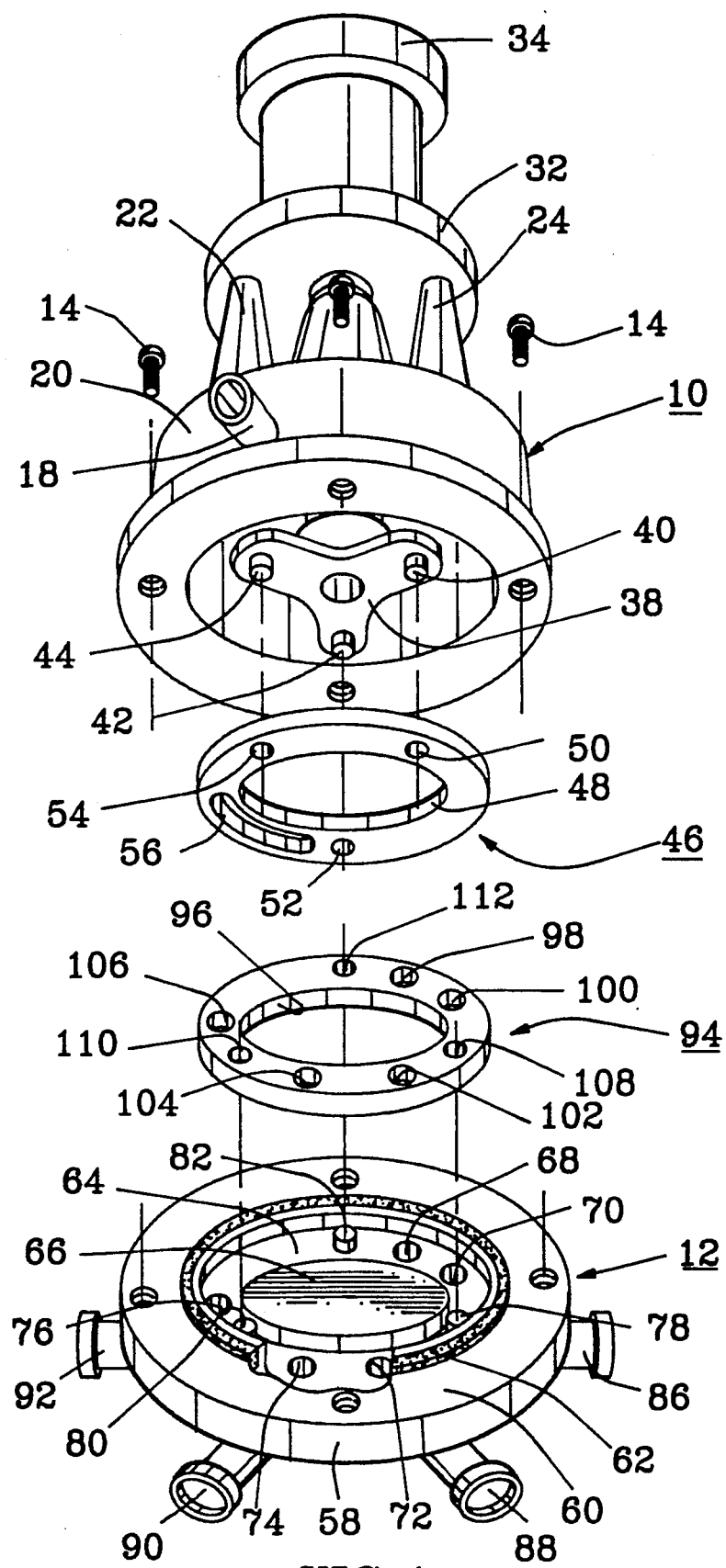
FIG. 1 is an exploded perspective view of the multi-way valve embodying the instant invention.
Figure 2:
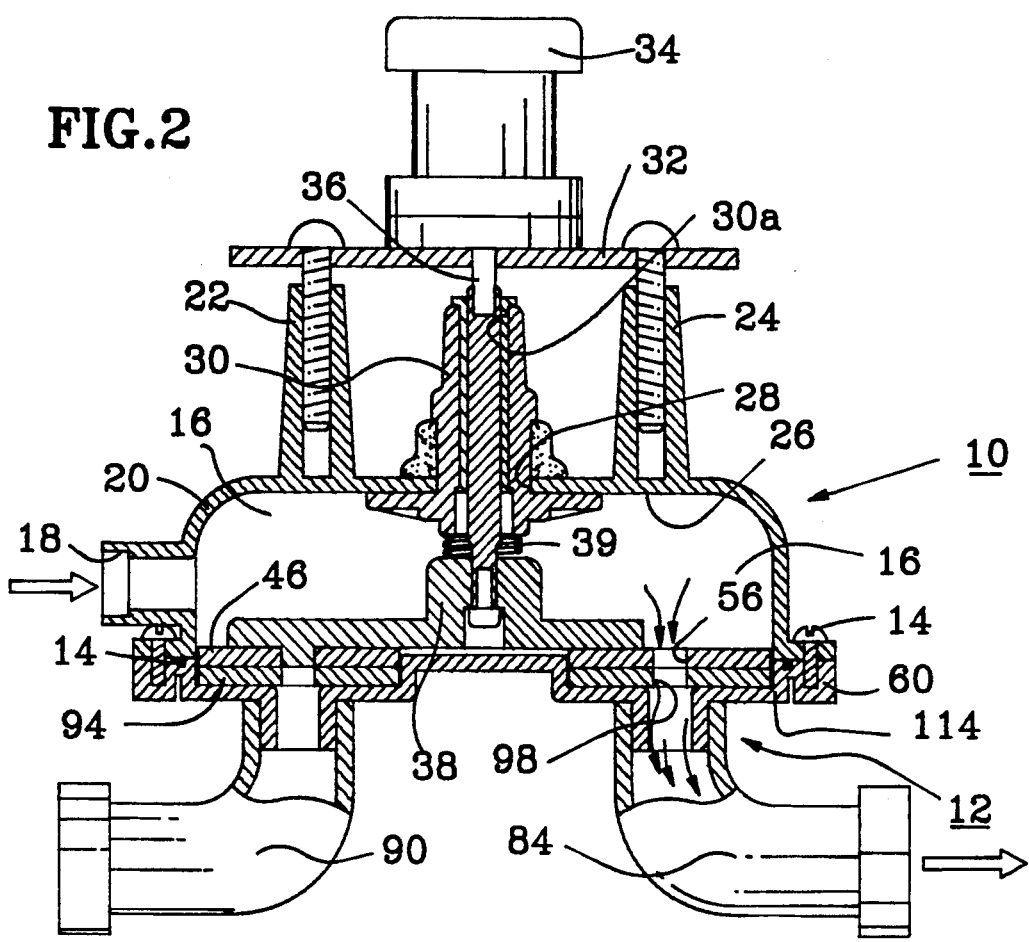
FIG. 2 is a cross-sectional view of the multi-way valve shown in FIG. 1.
Figure 3:
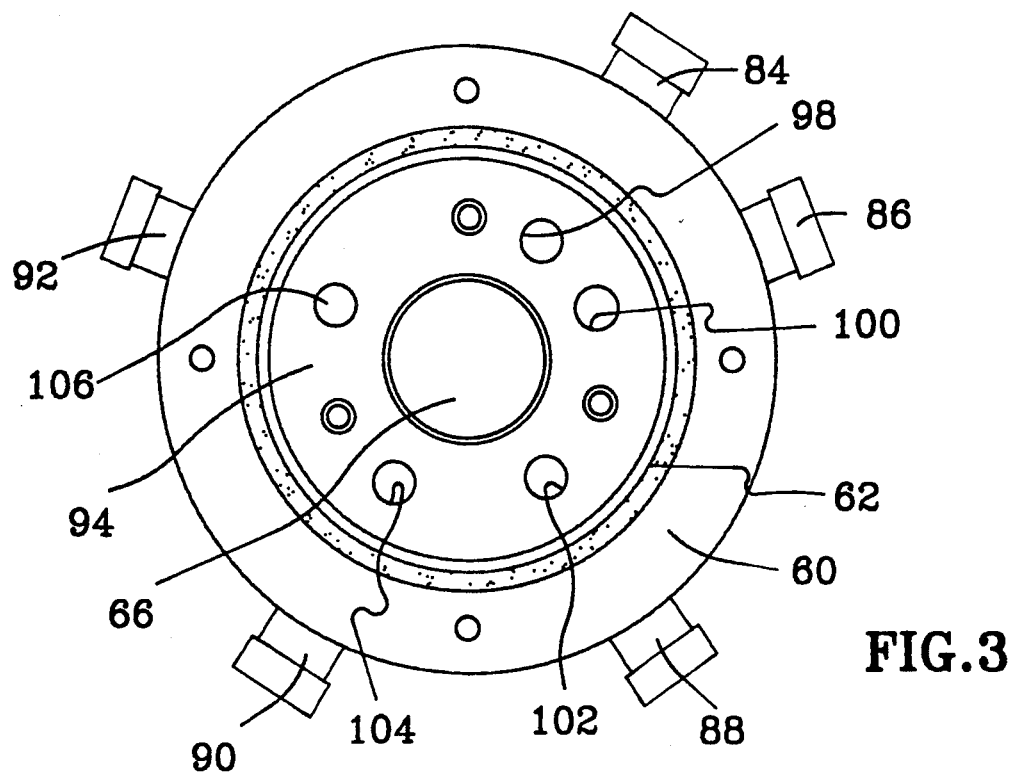
FIG. 3 is a top view of the lower casing constituting a part of the multi-way valve.

Referring now to FIGS. 1 to 3, the multi-way valve embodying the invention comprises an upper casing 10 and a lower casing 12 which may be combined together in a fluid-tight manner by means of screws 14 to thereby define a fluid chamber 16 therebetween. The upper casing 10 has an inlet port 18 at its side wall 20 and a pair of bosses 22 and 24 extending upward from its top wall 26. Further, the upper casing 10 has a central aperture 28 through which a bushing 30 having an axial bore 30a is fitted tightly but removably. Secured to the free ends of the bosses 22 and 24 is a plate-like bracket 32 which in turn supports a stepping motor 34 thereon. The stepping motor 34 is designed to activate under the control of an electronic controller (not shown) and is provided with an output shaft 36 extending into the fluid chamber 16 through the axial bore 30a of the bushing 30. At its free end, the output shaft 36 carries a holder 38 having three vertical pins or posts 40, 42 and 44 on the downwardly faced surface thereof, each of the pins being angularly spaced apart from one another by about 120°.

The holder 38 serves to grip an upper valve body 46 of a generally doughnut shape so that, when the stepping motor 34 is energized, the upper valve body 46 may be subject to rotational movement to a given angular position. Normally, the holder 38 and the upper valve body 46 are urged toward the lower casing 12 by means of a suitable bias means, e.g., coil spring 39. As can be seen in FIG. 1, the upper valve body 46 has a central opening 48 of a relatively large diameter, three through-holes 50, 52 and 54 arranged in an equal angular spacing of about 120° for engagement with the corresponding pins 40, 42 and 44 of the holder 38 and an arcuate slot 56 extending an angular extent of, e.g., 36°, along an imaginary circle.

As best shown in FIG. 3, the lower casing 12 of the multi-way valve consists of a cylindrical side wall 58, a flange 60 extending radially outwardly from the top of the side wall 58, an annular seal ring 62 affixed on the flange 60 and a bottom wall 64 which has a central upright projection 66 extending in a vertically upward direction. On the bottom wall 64 of the lower casing 12, first to fifth outlet ports 68, 70, 72, 74 and 76 are defined at a predetermined angular spacing along a common imaginary circle to allow selective passage of the pressurized fluid therethrough. Furthermore, it can be seen in FIG. 1 that three vertical pins or posts 78, 80 and 82 project from the bottom wall 64 in an equal angular spacing of about 120° with respect to one another. In the embodiment shown in the drawings, the first outlet port 68 is angularly offset from the second outlet port 70 by 36°, while the second to the fifth outlet ports 70, 72, 74 and 76 are arranged in an angular spacing of 72° to one another. It should be appreciated that the angular spacing stated above is not critical in the instant invention and, therefore, may be changed depending on the design of a particular multi-way valve. Preferably, the lower casing 12 is further provided with first to fifth elbows 84, 86, 88, 90 and 92, each forming an extension of the first to the fifth outlet ports 68, 70, 72, 74 and 76.

Turning back to FIG. 1, a lower valve body 94 of a generally doughnut shape is fixedly placed on the bottom wall 64 of the lower casing 12 against any rotational displacement. As shown, the lower valve body 94 has a central opening 96 of a relatively large diameter, first to fifth passage holes 98, 100, 102, 104 and 106, each coinciding with the outlet ports 68, 70, 72, 74 and 76 of the lower casing 12 when the valve body 94 is held in position, and three equally spaced through-holes 108, 110 and 112 into which are inserted the corresponding posts 78, 80 and 82 of the lower casing 12. The lower valve body 94 of the above construction comes into a fluid-tight, frictional contact with the upper valve body 46 which is driven by the stepping motor 34 to a predetermined angular position. In response to the energization of the stepping motor 34, the upper valve body 46 is subject to a rotational movement such that the arcuate slot 56 thereof may be selectively registered with one or more of the passage holes 98, 100, 102, 104 and 106 of the lower valve body 94. This will cause the pressurized fluid to flow out from the fluid chamber 16 of the multi-way valve, as indicated by the arrows in FIG. 2. Since the upper and the lower valve bodies 46 and 94 are in a frictional contact with each other, they should be preferably made of wear-resistant material, e.g., fine ceramics. Moreover, in order to avoid any fluid leakage between the upper and the lower valve bodies 46 and 94, each of the valve bodies should have a sufficiently smooth contact surface.

The operation of the multi-way valve will now be described with reference to FIGS. 4A to 4E in which the lower valve body 94 alone is depicted in a solid line, with the arcuate slot 56 of the upper valve body 46 shown in an imaginary line, for the sake of clarity.

Figure 4A:
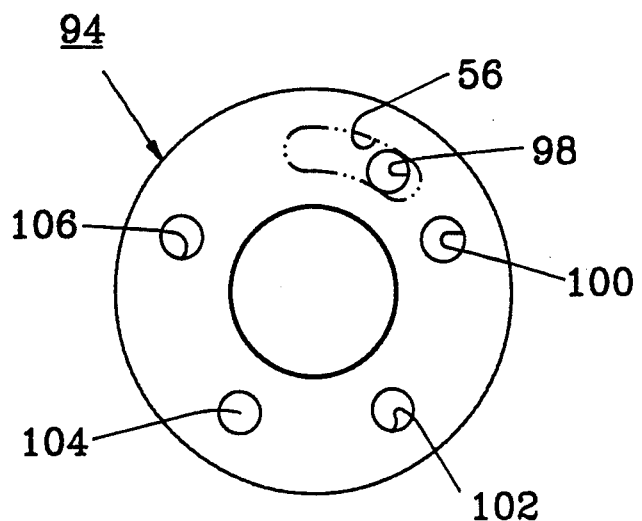
FIG. 4A is a schematic view showing the arcuate slot of the upper valve body which is registered with the first passage hole of the lower valve body.

Referring to FIG. 4A, it can be appreciated that the arcuate slot 56 of the upper valve body 46 is registered with the first passage hole 98 of the lower valve body 94. Under that condition, the pressurized fluid within the chamber 16 will flow through the arcuate slot 56 of the upper valve body 46, the first passage hole 98 of the lower valve body 94, the first outlet port 68 of the lower casing 12 and the first elbow 84 in the named sequence.

Figure 4B:
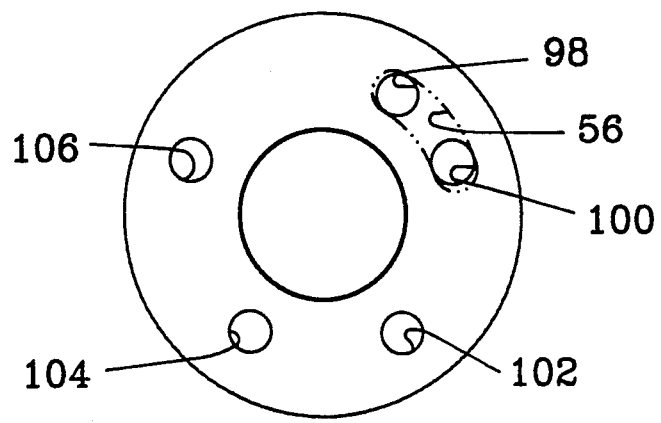
FIG. 4B is a view similar to FIG. 4A but showing the arcuate slot of the upper valve body which is in an alignment with both of the first and the second passage holes of the lower valve body in a simultaneous manner.

In FIG. 4B, the upper valve body 46 is caused to rotate by 36° in the clockwise direction so that the arcuate slot 56 may come into an alignment with both of the first passage hole 98 and the second passage hole 100 at the same time. Under that condition, the pressurized fluid will flow sequentially through the arcuate slot 56 of the upper valve body 46, the first passage hole 98 of the lower valve body 94, the first outlet port 68 of the lower casing 12 and the first elbow 84. Concurrently, the pressurized fluid will also pass through the arcuate slot 56, the second passage hole 100 of the lower valve body 94, the second outlet port 70 of the lower casing 12 and the second elbow 86.

Figure 4C:
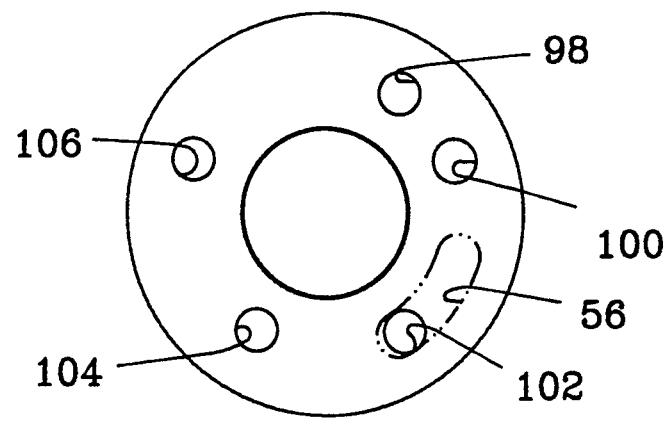
FIG. 4C shows the arcuate slot of the upper valve body coinciding with the third passage hole of the lower valve body.

Referring to FIG. 4C, the upper valve body 46 is caused to rotate by 72° in the clockwise direction so that the arcuate slot 56 can be in an alignment with the third passage hole 102 of the lower valve body 94. Under that condition, the pressurized fluid will flow through the arcuate slot 56 of the upper valve body 46, the third passage hole 102 of the lower valve body 94, the third outlet port 72 of the lower casing 12 and the third elbow 88.

Figure 4D:
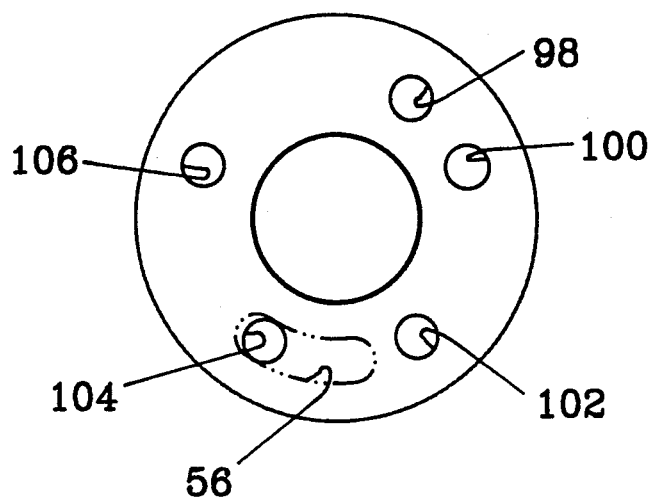
FIG. 4D illustrates the arcuate slot of the upper valve body coinciding with the fourth passage hole of the lower valve body.

Referring to FIG. 4D, the upper valve body 46 is shown to have been further rotated by 72° in the clockwise direction so that the arcuate slot 56 thereof can be in an alignment with the fourth passage hole 104 of the lower valve body 94. Under that condition, the pressurized fluid will flow through the arcuate slot 56 of the upper valve body 46, the fourth passage hole 104 of the lower valve body 94, the fourth outlet port 74 of the lower casing 12 and the fourth elbow 90.

Figure 4E:
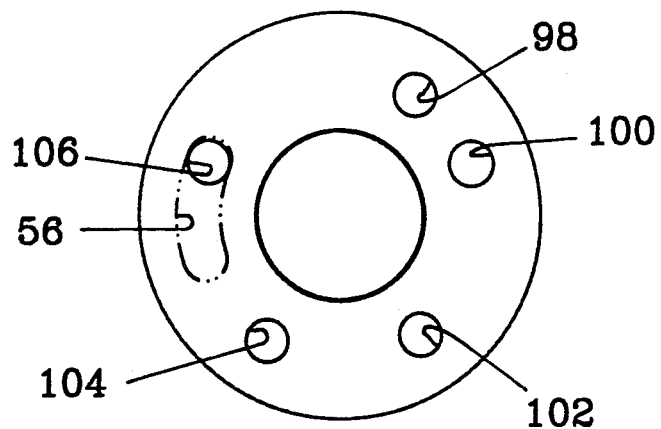
FIG. 4E depicts the arcuate slot of the upper valve body located in a final angular position wherein it coincides with the fifth passage hole.

In FIG. 4E, the arcuate slot 56 of the upper valve body 46 is shown to be in an alignment with the fifth passage hole 106 of the lower valve body 94, in which case the pressurized fluid will flow through the arcuate slot 56 of the upper valve body 46, the fifth passage hole 106 of the lower valve body 94, the fifth outlet port 76 of the lower casing 12 and the fifth elbow 92.

In this way, the inventive multi-way rotary valve can selectively feed the pressurized fluid to at least one of the five flow paths, in response to the operation mode of the machine or system incorporating the same.

While the multi-way valve has been described and shown to have five outlet ports arranged in a particular angular spacing, this is for illustrative purpose only; and, therefore, the actual number and spacing of the outlet ports may be changed in many different ways without departing from the scope of the invention as defined in the following claims.

What is claimed is:

1. A multi-way rotary valve for use with a machine or system adapted to perform certain operations with the aid of a fluid under pressure, comprising:
   an upper casing having an inlet port;
   a lower casing combined with the upper casing to form a fluid chamber therebetween, the lower casing having at least three outlet ports arranged in a predetermined angular spacing along a common imaginary circle;
   a lower disc-like ceramic valve body fixedly mounted on the bottom of the lower casing, the lower valve body having at least three passage holes which coincide with the corresponding outlet ports of the lower casing;

an upper disc-like ceramic valve body coming into a fluid-tight, frictional contact with the lower valve body for rotational movement with respect thereto, the upper valve body having an arcuate slot which is selectively registered with one or more of the passage holes of the lower valve body to establish a flow path of the pressurized flow;

means for holding the lower valve body in place against any displacement, the holding means including a plurality of spaced posts which extend upward from the bottom of the lower casing and a plurality of through-holes which are formed through the thickness of the lower valve body in a substantially equal spacing to receive the posts of the lower casing;

means for biasing the upper valve body toward the lower casing to ensure a close contact between the upper and the lower valve bodies; and means for causing the upper valve body to rotate to a selected angular position.

2. The multi-way rotary valve as recited in claim 1, wherein the arcuate slot of the upper valve body extends an angular extent of about 36° and wherein the passage holes of the lower valve body are so angularly spaced from one another as to allow the arcuate slot to coincide with at least one of the passage holes at a time.

3. The multi-way rotary valve as recited in claim 1, wherein the means for rotating the upper valve body comprises a stepping motor mounted outboard of the upper casing, a holder carrying the upper valve body thereon and a connecting rod for transmitting the rotational force of the stepping motor to the holder.

* * * * *